United States Patent
Gordon et al.

(10) Patent No.: US 9,513,632 B1
(45) Date of Patent: Dec. 6, 2016

(54) DRIVING MODE ALERTS FROM SELF-DRIVING VEHICLES

(71) Applicant: INTERNATIONAL BUSINESS MACHINES CORPORATION, Armonk, NY (US)

(72) Inventors: Michael S. Gordon, Yorktown Heights, NY (US); James R. Kozloski, New Fairfield, CT (US); Ashish Kundu, New York, NY (US); Peter K. Malkin, Ardsley, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/855,731

(22) Filed: Sep. 16, 2015

(51) Int. Cl.
  *G05D 1/00* (2006.01)
  *G08G 1/0967* (2006.01)

(52) U.S. Cl.
  CPC .......... *G05D 1/0061* (2013.01); *G05D 1/0088* (2013.01); *G08G 1/096725* (2013.01)

(58) Field of Classification Search
  CPC .......... G05D 1/02; G01C 21/36; G06F 3/016
  See application file for complete search history.

(56) References Cited

U.S. PATENT DOCUMENTS

| | | | |
|---|---|---|---|
| 5,975,791 A | 11/1999 | McCulloch | |
| 6,064,970 A | 5/2000 | McMillan et al. | |
| 6,326,903 B1 | 12/2001 | Gross et al. | |
| 6,502,035 B2 | 12/2002 | Levine | |
| 6,587,043 B1 | 7/2003 | Kramer | |
| 6,622,082 B1 | 9/2003 | Schmidt et al. | |
| 6,731,202 B1 | 5/2004 | Klaus | |
| 7,124,088 B2 | 10/2006 | Bauer et al. | |
| 7,877,269 B2 | 1/2011 | Bauer et al. | |
| 7,894,951 B2 | 2/2011 | Norris et al. | |
| 8,031,062 B2 | 10/2011 | Smith | |
| 8,078,349 B1 | 12/2011 | Prada Gomez et al. | |

(Continued)

FOREIGN PATENT DOCUMENTS

| | | |
|---|---|---|
| CN | 135063 | 11/1996 |
| CN | 202012052 | 10/2011 |

(Continued)

OTHER PUBLICATIONS

U.S. Appl. No. 14/887,388—Application filed Oct. 20, 2015.

(Continued)

*Primary Examiner* — Thomas Tarcza
*Assistant Examiner* — Alex C Dunn
(74) *Attorney, Agent, or Firm* — Law Office of Jim Boice (57) ABSTRACT

A computer-implemented method, system, and/or computer program product alerts a proximate entity of a current real-time driving mode of a vehicle. One or more processors determine a current real-time driving mode of a vehicle. The current real-time driving mode is either an autonomous mode or a manual mode. The vehicle is in the autonomous mode when being driven and controlled by an on-board computer, and the vehicle is in the manual mode when being driven and controlled by a human driver. The processor(s) generate a driving mode indicator that identifies the current real-time driving mode of the vehicle. An indicator emitter then broadcasts the driving mode indicator from the vehicle to the proximate entity, such that the driving mode indicator indicates the current real-time driving mode of the vehicle.

18 Claims, 7 Drawing Sheets

(56) References Cited

U.S. PATENT DOCUMENTS

| | | |
|---|---|---|
| 8,090,598 B2 | 1/2012 | Bauer et al. |
| 8,139,109 B2 | 3/2012 | Schmiedel et al. |
| 8,140,358 B1 | 3/2012 | Ling et al. |
| 8,190,322 B2 | 5/2012 | Lin et al. |
| 8,489,434 B1 | 7/2013 | Otis et al. |
| 8,509,982 B2 * | 8/2013 | Montemerlo ........ G05D 1/0214 701/26 |
| 8,660,734 B2 | 2/2014 | Zhu et al. |
| 8,676,466 B2 | 3/2014 | Mudalige |
| 8,793,046 B2 * | 7/2014 | Lombrozo ............ B60W 40/00 701/117 |
| 8,874,305 B2 | 10/2014 | Dolgov et al. |
| 8,880,270 B1 | 11/2014 | Ferguson et al. |
| 8,903,591 B1 | 12/2014 | Ferguson et al. |
| 8,949,016 B1 | 2/2015 | Ferguson et al. |
| 8,954,217 B1 | 2/2015 | Montemerlo et al. |
| 8,954,252 B1 | 2/2015 | Urmson et al. |
| 8,954,261 B2 | 2/2015 | Das et al. |
| 8,958,943 B2 | 2/2015 | Bertosa et al. |
| 8,965,621 B1 | 2/2015 | Urmson et al. |
| 8,983,705 B2 | 3/2015 | Zhu et al. |
| 8,996,224 B1 | 3/2015 | Herbach et al. |
| 9,014,905 B1 | 4/2015 | Kretzschmar et al. |
| 9,020,697 B2 * | 4/2015 | Ricci .................... H04W 48/04 701/36 |
| 9,024,787 B2 | 5/2015 | Alshinnawi et al. |
| 9,082,239 B2 * | 7/2015 | Ricci ....................... B60Q 1/00 |
| 9,305,411 B2 * | 4/2016 | Ricci .................... H04W 48/02 |
| 2004/0199306 A1 | 10/2004 | Heilmann et al. |
| 2005/0104745 A1 | 5/2005 | Bachelder et al. |
| 2006/0106671 A1 | 5/2006 | Biet |
| 2006/0200379 A1 | 9/2006 | Biet |
| 2007/0100687 A1 | 5/2007 | Yoshikawa |
| 2008/0048850 A1 | 2/2008 | Yamada |
| 2009/0248231 A1 | 10/2009 | Kamiya |
| 2010/0179720 A1 | 7/2010 | Lin et al. |
| 2012/0277947 A1 | 11/2012 | Boehringer et al. |
| 2013/0030657 A1 | 1/2013 | Chatterjee et al. |
| 2013/0261871 A1 | 10/2013 | Hobbs et al. |
| 2014/0095214 A1 | 4/2014 | Mathe et al. |
| 2014/0129073 A1 | 5/2014 | Ferguson |
| 2014/0188999 A1 | 7/2014 | Leonard et al. |
| 2014/0195213 A1 | 7/2014 | Kozloski et al. |
| 2014/0214255 A1 | 7/2014 | Dolgov et al. |
| 2014/0222277 A1 | 8/2014 | Tsimhoni et al. |
| 2014/0297116 A1 | 10/2014 | Anderson et al. |
| 2014/0310186 A1 | 10/2014 | Ricci |
| 2014/0324268 A1 | 10/2014 | Montemerlo et al. |
| 2014/0358331 A1 | 12/2014 | Prada Gomez et al. |
| 2014/0358353 A1 | 12/2014 | Ibanez-Guzman et al. |
| 2015/0006005 A1 | 1/2015 | Yu et al. |
| 2015/0035685 A1 | 2/2015 | Strickland et al. |
| 2015/0051778 A1 | 2/2015 | Mueller |
| 2015/0066284 A1 | 3/2015 | Yopp |
| 2015/0095190 A1 | 4/2015 | Hammad et al. |
| 2015/0134178 A1 | 5/2015 | Minoiu-Enache |

FOREIGN PATENT DOCUMENTS

| | | |
|---|---|---|
| CN | 102650882 | 8/2012 |
| CN | 202772924 | 3/2013 |
| WO | 2014058263 A1 | 4/2014 |
| WO | 2014147361 A1 | 9/2014 |
| WO | 2014148975 A1 | 9/2014 |
| WO | 2014148976 A1 | 9/2014 |
| WO | 2015024616 A1 | 2/2015 |
| WO | 2015056105 A1 | 4/2015 |

OTHER PUBLICATIONS

A. Abkowitz, "Do Self-Driving Cars Spell Doom for Auto Insurers?", Bloomberg L.P., Sep. 10, 2014, pp. 1-2.

Anonymous, "Self-Driving Cars and Insurance", Insurance Information Institute, Inc., Feb. 2015, pp. 1-3.

Gomes, Lee. "Google'S Self-Driving Cars Still Face Many Obstacles / MIT Technology Review.", MIT Technology Review. Aug. 28, 2014. Web. <http://www.technologyreview.co,/news/530276/hidden-obstabscles-for-googles-self-driving-cars/>.

Smith, Mark. "Inovations: Emerging Trends in the Wheelchair Market." New Mobility Magazine, Aug. 1, 2014. Web. <http://www.newmobility.com/2014/08/emerging-trends/>.

Crothers, Brooke. "Google Now Reporting Self-Driving Car Accidents: Her, It's Not the Car's Fault". forbes.com, Jun. 8, 2015. <http://www.forbes.com/sites/brookecrothers/2015/06/08/google-now-reportibg-driverless-car-accidents/>.

Anonymous, 'System and Method to Target Advertisements for the Right Focus Group'. IP.com, No. 000218285, May 31, 2012, pp. 1-2.

Anonymous, "Car Built-In Mechanism to Enforce Mandatory Self-Driving Mode", IP.com, No. 000234916, Feb. 14, 2014, pp. 1-3.

T. Horberry et al., "Driver Distraction: The Effects of Concurrent In-Vehicle Tasks, Road Enviornment Complexity and Age on Driving Performance", Elsevier Ltd., Accident Analysis and Prevention, 38, 2006, pp. 185-191.

J. Miller, "Self-Driving Car Technologu's Benefits, Potential Risks, and Solutions", The Energy Collective, theenergycollective.com, Aug. 19, 2014, pp. 1-7.

J. O'Callaghan, "Inside the Mercedes Self-Guidubg Car That's Built for Luxurious Living in, Not Driving", Associated Newspapers Ltd., Daily Mail, dailymail.com.UK, Jan. 6, 2015, pp. 1-13.

J. Wei et al., "Towards a Viable Autonomous Driving Research Platform", IEEE, Intelegent Vehicles Symposium (IV), 2013, pp. 1-8.

J. Farrier, "Airlines Infuse Their Planes With Smells to Calm You Down", Neatorama, neatorama.com, Mar. 29, 2015, 1 Page.

T. Vanderbilt, "Let the Robot Drive: The Autonomous Car of the Future is Here", Wired Magazine, Conde Nast, www.wired.com, Jan. 20, 2012. pp. 1-34.

Chen S, et al., A Crash Risk Assessment Model for Roas Curves. Inproceedings 20th International Technical Conference on the Enhanced Saftey of Vehicles., 2007. Lyon, France.

E. Lehrer, "The Insurance Implications of Google's Self-Driving Car", Insurance Journal, Right Street Bloh=G, May 28, 2014, pp. 1-2.

Anonymous, "Diagnostics Mechanism for Self-Driving Cars to Validate Self-Driving Capabilities", IP.com, Jun. 6, 2014, pp. 1-5. IP.com.

P. Mell et al., "The NIST Definition of Cloud Computing", National Institute of Standards and Technology, Information Technology Laboratory, Sep. 2011, pp. 1-7.

X. Jardin, "Terrifying dashcam video captures distracted teen drivers crashing while goofing off", Boing Boing, www.boingboing.net, Mar. 26, 2015, 1 page.

M. Fox, "Self-driving cars safer than those driven by humans: Bob Lutz", CNBC, www.cnbc.com, Sep. 8, 2014, 1 page.

* cited by examiner

DRIVING MODE ALERTS FROM SELF-DRIVING VEHICLES

BACKGROUND

The present disclosure relates to the field of vehicles, and specifically to the field of self-driving vehicles. Still more specifically, the present disclosure relates to the field of automatically triggering specific alarms and/or alerts to a proximate entity from a vehicle based on whether the vehicle is in autonomous mode or manual mode.

Self-driving vehicles (SDVs) are vehicles that are able to autonomously drive themselves through private and/or public spaces. Using a system of sensors that detect the location and/or surroundings of the SDV, logic within or associated with the SDV controls the propulsion, stopping, and steering of the SDV based on the sensor-detected location and surroundings of the SDV.

SUMMARY

A computer-implemented method, system, and/or computer program product alerts a proximate entity of a current real-time driving mode of a vehicle. One or more processors determine a current real-time driving mode of a vehicle. The current real-time driving mode is either an autonomous mode or a manual mode. The vehicle is in the autonomous mode when being driven and controlled by an on-board computer, and the vehicle is in the manual mode when being driven and controlled by a human driver. The processor(s) generate a driving mode indicator that identifies the current real-time driving mode of the vehicle. An indicator emitter then broadcasts the driving mode indicator from the vehicle to the proximate entity, such that the driving mode indicator indicates the current real-time driving mode of the vehicle.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Product provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
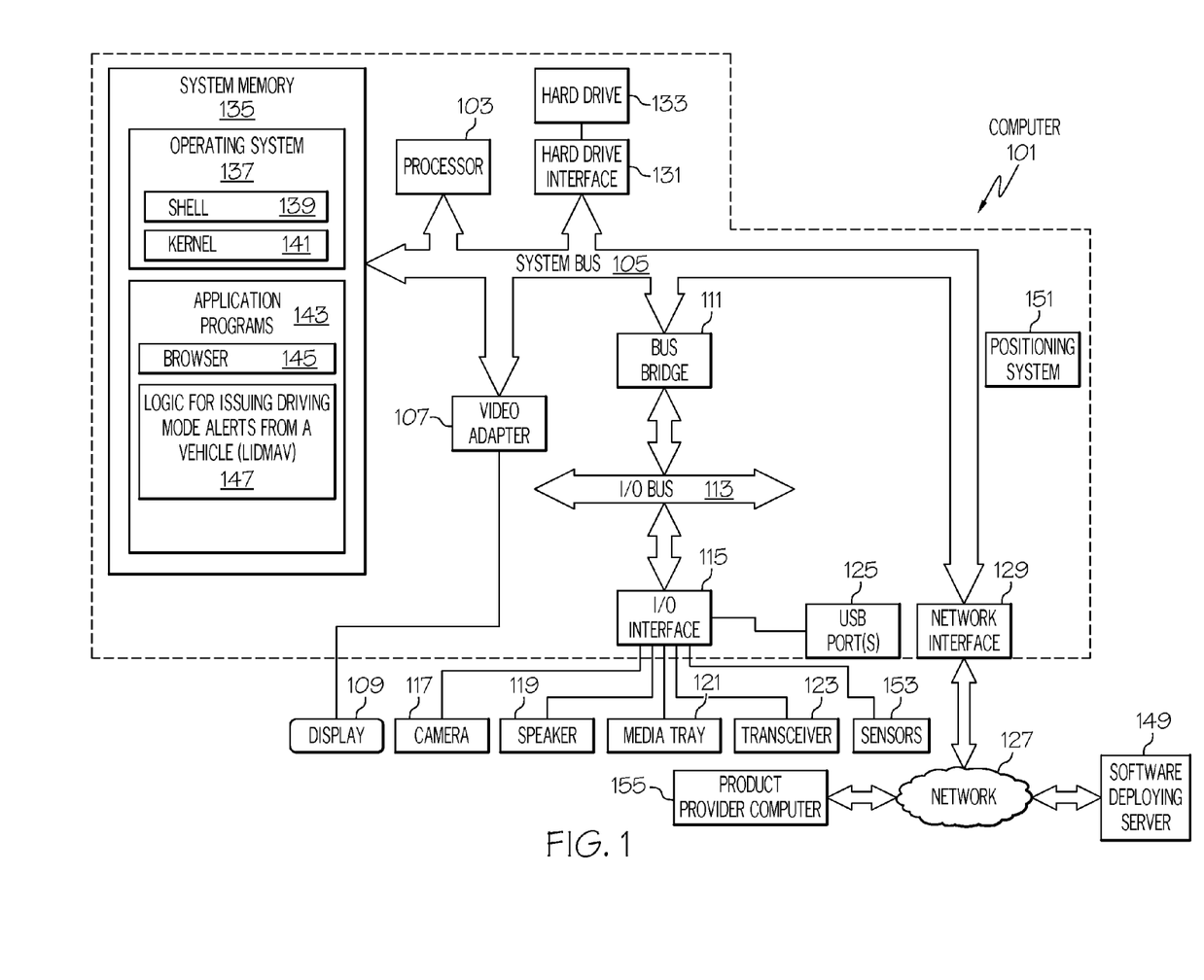
FIG. 1 depicts an exemplary system and network in which the present disclosure may be implemented.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or a product provider computer 155 shown in FIG. 1, and/or a self-driving vehicle (SDV) on-board computer 301 shown in FIG. 3.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a camera 117 (e.g., a digital camera that is capable of capturing still and/or moving images), a speaker 119, a media tray 121 (which may include storage devices such as CD-ROM drives, multi-media interfaces, etc.), a transceiver 123 (capable of transmitting and/or receiving electronic communication signals), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems (e.g., product provider computer 155) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Logic for Issuing Driving Mode Alerts from a Vehicle (LIDMAV) 147. LIDMAV 147 includes code for implementing the processes described below, including those described in FIGS. 2-5. In one embodiment, computer 101 is able to download LIDMAV 147 from software deploying server 149, including in an on-demand basis, wherein the code in LIDMAV 147 is not downloaded until needed for execution. In one embodiment of the present invention, software deploying server 149 performs all of the functions associated with the present invention (including execution of LIDMAV 147), thus freeing computer 101 from having to use its own internal computing resources to execute LIDMAV 147.

Also within computer 101 is a positioning system 151, which determines a real-time current location of computer 101 (particularly when part of a self-driving vehicle or a non-self-driving vehicle as described herein). Positioning system 151 may be a combination of accelerometers, speedometers, etc., or it may be a global positioning system (GPS) that utilizes space-based satellites to provide triangulated signals used to determine two or three dimensional locations.

Also associated with computer 101 are sensors 153, which detect an environment of the computer 101. More specifically, sensors 153 are able to detect other vehicles, road obstructions, pedestrians, construction sites, etc. For example, if computer 101 is on board a self-driving vehicle (SDV), then sensors 153 may be cameras, radar transceivers, microphones, etc. that allow the SDV to detect the environment (e.g., other vehicles, road obstructions, pedestrians, etc.) of that SDV.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
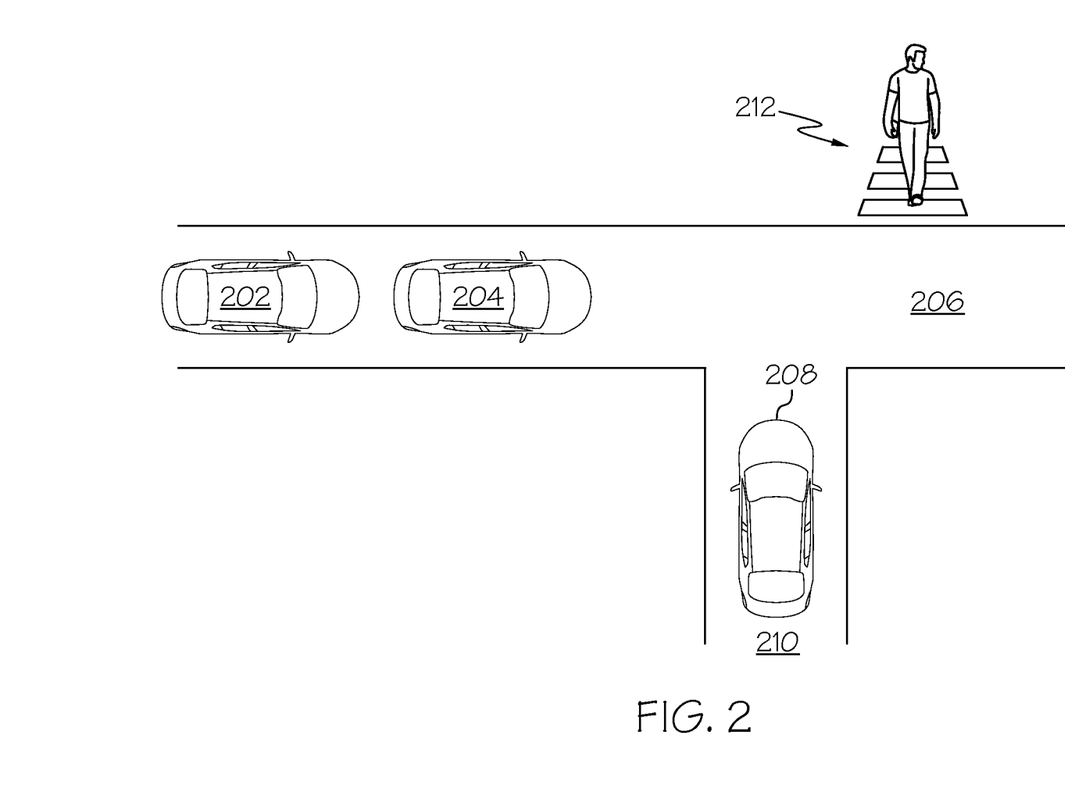
FIG. 2 illustrates two vehicles operating on a roadway in accordance with one or more embodiments of the present invention.

With reference now to FIG. 2, a first vehicle 202 and a second vehicle 204 are depicted operating on a first roadway 206, and a third vehicle 208 is depicted operating on a second roadway 210, which intersects with the first roadway 206.

While vehicle 202, vehicle 204, and vehicle 208 are depicted as automobiles, it is understood that in one or more embodiments of the present invention, the vehicle and/or proximate entity presented herein may be any type of roadway vehicle (e.g., an automobile, a truck, a motorcycle, etc.), a water vehicle (e.g., a power boat, a ship, a sailing vessel, a hovercraft, a personal water craft, etc.), an airborne vehicle (e.g., a passenger or cargo aircraft, a drone, etc.), a rail vehicle (i.e., a train, trolley or similar vehicle that runs on a light or heavy rail system), etc. Similarly and in one or more embodiments of the present invention, a "proximate entity" described and/or claimed as an entity being within a predefined proximity of a first vehicle (e.g., vehicle 208) may be a second vehicle (e.g., vehicle 204) of the same or different type as the first vehicle (e.g., vehicle 208), or the "proximate entity" may be a non-vehicle, such as pedestrian 212 shown in FIG. 2.

As shown in FIG. 2, vehicle 202 and vehicle 204 are traveling in close proximity to one another. If both vehicle 202 and vehicle 204 are being operated in manual mode, then this "tailgating" is unduly dangerous. However, if one or both of vehicles 202/204 are operating in autonomous mode, then this "tailgating" may be within accepted safety parameters, due to the performance capabilities of self-driving vehicle operating in autonomous mode.

Figure 3:
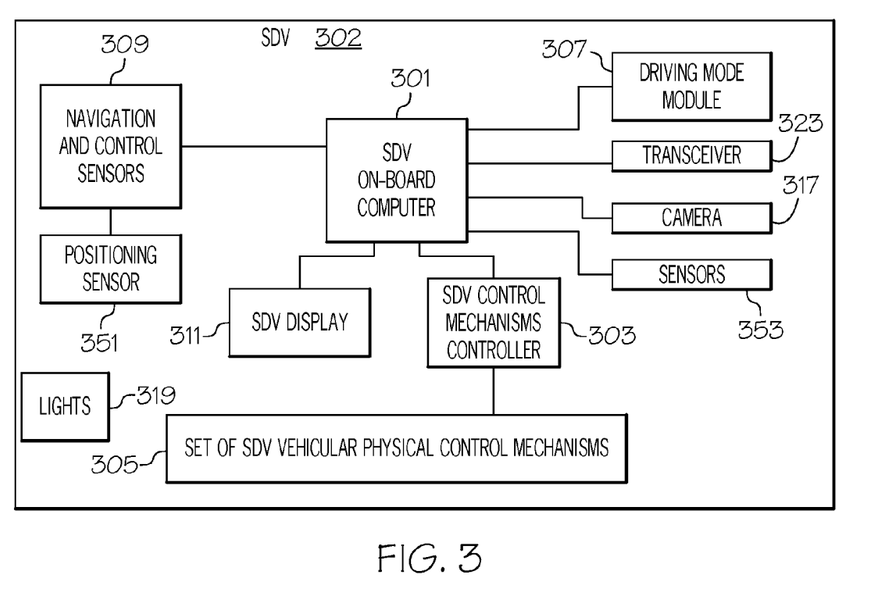
FIG. 3 depicts detail of control hardware within a self-driving vehicle (SDV)

In order to illustrate an exemplary manual mode (i.e., a manual driving mode) and an exemplary autonomous mode (i.e., an autonomous driving mode), reference is now made to FIG. 3, which depicts detail of electronic devices within an SDV 302. SDV 302, which may be representative of one or more of the vehicles 202/204/208 depicted in FIG. 2, has an SDV on-board computer 301 that controls operations of the SDV 302. According to directives from a driving mode module 307, SDV 302 can be selectively operated in manual mode or autonomous mode.

While in manual mode, SDV 302 operates as a traditional motor vehicle, in which a human driver controls the engine, steering mechanism, braking system, horn, signals, etc. found on a motor vehicle. These vehicle mechanisms may be operated in a "drive-by-wire" manner, in which inputs to an SDV control mechanisms controller 303 by the driver result in output signals that control the SDV vehicular physical control mechanisms 305 (e.g., the engine throttle, steering mechanisms, braking systems, turn signals, etc.).

While in autonomous mode, SDV 302 operates without the input of a human driver, such that the engine, steering mechanism, braking system, horn, signals, etc. are still controlled by the SDV control mechanisms controller 303, but now under the control of the SDV on-board computer 301. That is, by processing inputs taken from navigation and control sensors 309 (which may use inputs from a positioning sensor 351, analogous to positioning sensor 151 shown in FIG. 1, to indicate the current position of the SDV 302) and the driving mode module 307 indicating that the SDV 302 is to be controlled autonomously, then driver inputs are no longer needed.

As just mentioned, the SDV on-board computer 301 uses outputs from navigation and control sensors 309 to control the SDV 302. Navigation and control sensors 309 include hardware sensors that (1) determine the location of the SDV 302; (2) sense other cars and/or obstacles and/or physical structures around SDV 302; (3) measure the speed and direction of the SDV 302; and (4) provide any other inputs needed to safely control the movement of the SDV 302.

With respect to the feature of (1) determining the location of the SDV 302, this is achieved in one or more embodiments of the present invention through the use of a positioning system such as positioning system 151 shown in FIG. 1. Positioning system 151 may use a global positioning system (GPS), which uses space-based satellites that provide positioning signals that are triangulated by a GPS receiver to determine a 3-D geophysical position of the SDV 302. Positioning system 151 may also use, either alone or in conjunction with a GPS system, physical movement sensors such as accelerometers (which measure rates of changes to a vehicle in any direction), speedometers (which measure the instantaneous speed of a vehicle), air-flow meters (which measure the flow of air around a vehicle), etc. Such physical movement sensors may incorporate the use of semiconductor strain gauges, electromechanical gauges that take readings from drivetrain rotations, barometric sensors, etc.

With respect to the feature of (2) sensing other cars and/or obstacles and/or physical structures around SDV 302, the positioning system 151 may use radar or other electromagnetic energy that is emitted from an electromagnetic radiation transmitter (e.g., transceiver 323 shown in FIG. 3), bounced off a physical structure (e.g., another car), and then received by an electromagnetic radiation receiver (e.g., transceiver 323). By measuring the time it takes to receive back the emitted electromagnetic radiation, and/or evaluating a Doppler shift (i.e., a change in frequency to the electromagnetic radiation that is caused by the relative movement of the SDV 302 to objects being interrogated by the electromagnetic radiation) in the received electromagnetic radiation from when it was transmitted, the presence and location of other physical objects can be ascertained by the SDV on-board computer 301.

With respect to the feature of (3) measuring the speed and direction of the SDV 302, this accomplished in one or more embodiments of the present invention by taking readings from an on-board speedometer (not depicted) on the SDV 302 and/or detecting movements to the steering mechanism (also not depicted) on the SDV 302 and/or the positioning system 151 discussed above.

With respect to the feature of (4) providing any other inputs needed to safely control the movement of the SDV 302, such inputs include, but are not limited to, control signals to activate a horn, turning indicators, flashing emergency lights, etc. on the SDV 302.

In one or more embodiments of the present invention, SDV 302 has one or more lights 319, which preferably can be controlled by the SDV on-board computer 301 or other hardware logic (not shown) in SDV 302 to makes the lights 319 flash, emit a certain color, emit a certain intensity, etc.

Returning again to FIG. 2, in which vehicle 202 is depicted "tailgating" vehicle 204, assume that vehicle 202 is currently being operated in autonomous mode. However, without the present invention, occupants of vehicle 204 and/or the SDV on-board computer 301 within vehicle 204 do not know this, and will assume that vehicle 202 is operating in manual mode. As such, the occupants of vehicle 204 and/or the SDV on-board computer 301 within vehicle 204 will be concerned that vehicle 204 is likely to be rear-ended if vehicle 204 stops suddenly, since a human driver response time of a driver of vehicle 202 will be too long to stop vehicle 202 in time.

In order to address this problem (of not knowing if SDV 202 is operating in autonomous mode or manual mode), vehicle 202 generates and transmits an autonomous driving mode indicator, which indicates that vehicle 202 is operating in autonomous mode. This allows the occupants of vehicle 204 and/or the SDV on-board computer 301 within vehicle 204 to trust vehicle 202 not to rear-end vehicle 204, due to the optimal response time of the SDV on-board computer 301 within vehicle 202. Similarly, if vehicle 208 is operating in autonomous mode, then a driving mode indicator received from vehicle 208 lets the occupants of vehicle 204 and/or the SDV on-board computer 301 within vehicle 204 know that there is no need to ensure that the driver of vehicle 208 sees vehicle 204, since the SDV on-board computer in vehicle 208 will reliably prevent vehicle 208 from unexpectedly pulling into the intersection of roadway 206 and roadway 210 and hitting vehicle 204.

Alternatively, vehicle 202 and/or vehicle 208 may be operating in manual mode. As such, the driver of vehicle 204 and/or the SDV on-board computer 301 within vehicle 204 will compensate for the slower reaction time and less predictability of movement of the vehicle 202 and/or vehicle 208. That is, vehicle 202 and/or vehicle 208 generates and transmits a manual driving mode indicator, which indicates that vehicle 202/208 is operating in manual mode. This allows the occupants of vehicle 204 and/or the SDV on-board computer 301 within vehicle 204 to take steps to ensure that vehicle 204 does not collide with vehicle 202 (e.g., by causing vehicle 204 to accelerate in order to get away from tailgating vehicle 202) or vehicle 208 (e.g., by causing vehicle 204 to slow down or steer away from vehicle 208, in order to have more time to avoid colliding with vehicle 208 if necessary).

In one embodiment of the present invention, all driving mode indicators received by the SDV on-board computer 301 within vehicle 204 are automatically responded to and/or acknowledged by the SDV on-board computer 301. That is, whenever the SDV on-board computer 301 within vehicle 204 receives a driving mode indicator (autonomous or manual) from vehicle 202 or vehicle 208, the SDV on-board computer 301 (1) will adjust the operation of vehicle 204 in accordance with whether vehicle 202 and/or vehicle 208 are operating in autonomous or manual mode, and/or (2) will send an acknowledgement message back to vehicle 202 and/or vehicle 208 indicating that the SDV on-board computer 301 has received the driving mode indicator. Optionally, a driver of vehicle 204 can override these actions, such that the SDV on-board computer 301 (1) will not adjust the operation of vehicle 204 in accordance with whether or not vehicle 202 and/or vehicle 208 are operating in autonomous or manual mode, and/or (2) will not send an acknowledgement message back to vehicle 202 and/or vehicle 208 indicating that the SDV on-board computer 301 has received the driving mode indicator.

While FIG. 2 has been described in embodiments in which vehicle 204 is depicted as a proximate entity that is near vehicle 202 and/or vehicle 208, in one embodiment the proximate entity that is near vehicle 202 and/or vehicle 208 is a non-vehicle, such as a pedestrian 212 (which may be a person walking, in a wheelchair, on a bicycle, etc.). That is, as described herein, in one embodiment vehicles such as vehicle 204 (a proximate entity that is near vehicle 208) and vehicle 208 (a vehicle) communicate with one another in order to avoid hitting each other.

However, in another embodiment, vehicle 208 emits a driving mode indicator to pedestrian 212, which may or may not be prompted by a signal from the pedestrian 212 (e.g., an electronic signal from a smart phone being carried by pedestrian 212, hand waving by the pedestrian 212 that is detected by a camera on the vehicle 208, etc.).

In accordance with various embodiments of the present invention, the driving mode indicator (indicating whether vehicle 208 is operating in autonomous or manual mode) that is broadcast from vehicle 208 is an electronic signal (i.e., an electronic message sent to a smart phone being carried by pedestrian 212), a visual signal (e.g., flashing lights, certain colored lights, etc. on vehicle 208), a sound (e.g., a certain sound, melody, etc. being broadcast from a speaker or horn on vehicle 208), etc. Thus, pedestrian 212 is alerted to the fact that the vehicle 208 is operating in autonomous mode (and thus is assumed to recognize the presence and/or movement of pedestrian 212) or is being operated in manual mode (and thus pedestrian 212 needs to ensure that the driver of vehicle 208 sees pedestrian 212 by making eye contact, etc.) according to the driving mode indicator being broadcast from the vehicle 208.

Figure 4:
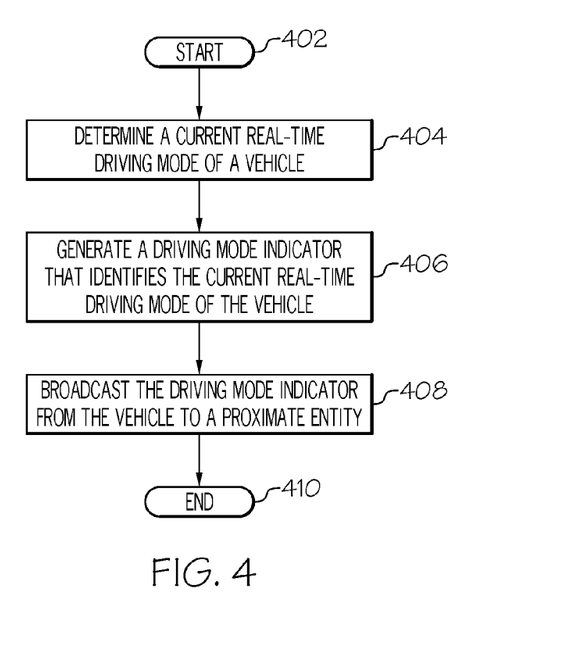
FIG. 4 is a high-level flow chart of one or more steps performed by one or more processors and/or other hardware to alert a proximate entity of a current real-time driving mode of a vehicle.

With reference now to FIG. 4, a high-level flow chart of one or more steps performed by one or more processors and/or other hardware to alert a proximate entity of a current real-time driving mode of a vehicle is presented.

After initiator block 402, one or more processors (e.g., within SDV on-board computer 301 shown in FIG. 3) determine a current real-time driving mode of a vehicle (e.g., vehicle 202 shown in FIG. 2), as described in block 404. The current real-time driving mode is either an autonomous mode or a manual mode. The vehicle is in the autonomous mode when being driven and controlled by an on-board computer (e.g., SDV on-board computer 301 shown in FIG. 3). The vehicle is in the manual mode when being driven and controlled by a human driver (e.g., by bypassing the SDV on-board computer 301, and allowing the driver to control the set of SDV vehicle physical control mechanisms 305, with or without the use of the SDV control mechanisms controller 303 shown in FIG. 3).

As described in block 406, the processor(s) generate a driving mode indicator that identifies the current real-time driving mode of the vehicle. That is, the driving mode indicator indicates whether the vehicle is being operated in autonomous or manual mode.

As described in block 408, an indicator emitter (e.g., transceiver 323 shown in FIG. 3, a horn or speaker 119 on SDV 302, a light 319 shown in FIG. 3) broadcasts the driving mode indicator from the vehicle (e.g., vehicle 202 shown in FIG. 2) to a proximate entity (e.g., vehicle 204 or pedestrian 212 shown in FIG. 2). This driving mode indicator indicates the current real-time driving mode (autonomous or manual) of the vehicle.

The flow chart shown in FIG. 4 ends at terminator block 410.

Thus, in one embodiment of the present invention, the driving mode indicator is a visual indicator that is generated by the vehicle, such as flashing lights, a certain color/intensity of light, a text message on a display on the vehicle, etc.

Furthermore, in one embodiment of the present invention, the driving mode indicator is a sound that is generated by a speaker, horn, etc. on the vehicle. This driving mode indicator may be a simple horn alert, or a verbal message identifying the current real-time driving mode (autonomous or manual) of the vehicle.

In one embodiment of the present invention, wherein the proximate entity (e.g., vehicle 204) is an autonomous vehicle (i.e., is being controlled by the SDV on-board computer 301) that is within a predefined distance from the vehicle (e.g., vehicle 202). In such an exemplary embodiment, the driving mode indicator is an electronic indicator that is transmitted to an on-board computer (e.g., SDV on-board computer 301) on the autonomous vehicle (e.g., vehicle 204). That is, assume that vehicle 204 is driving in autonomous mode, as is vehicle 202 in FIG. 2. As such, vehicle 202 and vehicle 204 will communicate using their respective SDV on-board computers 301 or other hardware capable of transmitting and receiving the driving mode indicator as an electronic signal (e.g., an electromagnetic wave).

In one embodiment of the present invention, the processor(s) (e.g., within SDV on-board computer 301 or similar hardware) stops the broadcasting of the driving mode indicator from the vehicle to the proximate entity. That is, vehicle 202 in FIG. 2 will stop sending an electromagnetic wave signal, a light signal, a sound signal, etc. that identifies whether the vehicle 202 is operating in the autonomous or manual mode. Thereafter, the processor(s) receive an interrogation message from the proximate entity (e.g., the SDV on-board computer 301 within vehicle 204, a smart phone being carried by pedestrian 212, etc.). The interrogation message requests the current real-time drive mode of the vehicle (vehicle 202). In response to receiving the interrogation message from the proximate entity, the processor(s) on vehicle 202 will broadcast the driving mode indicator from the vehicle (e.g., vehicle 202) to the proximate entity (e.g., SDV 204, pedestrian 212, etc.). Thus, the lights, speaker, electronic signal that are the driving mode indicator described herein is only sent to proximate entities (e.g., those entities that are within a predetermined distance of vehicle 202) when so requested by the proximate entities.

In one embodiment of the present invention, the vehicle (e.g., vehicle 202) is a vehicle that is capable of being driven in the autonomous mode, but is currently being driven in manual mode. As such, one or more processors (e.g., within the SDV on-board computer 301 within vehicle 202) retrieve a profile of a driver of the vehicle (vehicle 202), and then assign that driver to a cohort of persons. That is, the driver of vehicle 202 shares more than a predetermined quantity of traits with members of the cohort of persons (e.g., medical conditions, accident rates, etc.). The processor(s) then receive a driver safety rating (e.g., based on their accident rate while operating vehicle in manual mode, as contained in a database of accident histories for the members of the cohort of persons) for the cohort of persons. In response to the driver safety rating for the cohort of persons falling below a predetermined value, the processor(s) automatically change the driving mode of the vehicle from the manual mode to the autonomous mode. That is, if the driver of vehicle 202 has the same traits as members of the cohort, and that cohort has a bad driving record, then an assumption is made that the driver of vehicle 202 is also likely to be a bad driver, and vehicle 202 enters autonomous mode, thus protecting vehicle 202 as well as vehicles/pedestrians that are near vehicle 202.

In one embodiment of the present invention, one or more processor(s) receive interrogation messages from multiple proximate entities, where the interrogation messages request the current real-time drive mode of the vehicle. For example, vehicle 204 and vehicle 208 and pedestrian 212 shown in FIG. 2 may interrogate vehicle 202 in order to ascertain whether vehicle 202 is operating in autonomous mode or manual mode. Processor(s) within vehicle 202 then determine how many interrogation messages are being received from the multiple proximate entities (in this case, three). In response to determining that the quantity of interrogation messages exceeds a predetermined amount (e.g., two), the processor(s) within vehicle 202 broadcast the driving mode indicator (lights, sounds, electromagnetic waves, etc.) from the vehicle to the proximate entities.

In an embodiment of the present invention, a weighted voting system is used to weight various interrogation messages used in making the decision regarding whether or not SDV 202 transmits the driving mode indicator. For example, assume that interrogation messages from a vehicle operating in autonomous mode are weighted low (e.g., 1), interrogation messages from a vehicle operating in manual mode are weighted medium (e.g., 2), and interrogation messages from a pedestrian are weighted high (e.g., 3). This is due to the presumption that the autonomous vehicle will be able to navigate around another vehicle regardless of whether the other vehicle is operating in autonomous or manual mode (and thus the low weighting of "1"). Furthermore, the likelihood of a manual vehicle hitting another manual vehicle is greater than the manual vehicle hitting another vehicle that is operating in autonomous mode. Nonetheless, the chance of doing so is greater than if both vehicles are in autonomous mode (and thus the medium weighting of "2"). However, a pedestrian is in great need of knowing whether or not a vehicle is operating in manual or autonomous mode, since there is really no such thing as a minor vehicle/pedestrian collision (and thus the high weighting of "3"). Thus, the interrogation messages are (I1, I2, . . . , IN), where "N" denotes the total number of inputs. An input's weight (w) is how significant the input level is (i.e., how significant (weighted) the input is). A quota (q) is the minimum number of votes (e.g., weighted inputs from the proximate entities) required to "pass a motion", which in this case refers to a decision made to broadcast the driving mode indicator from the vehicle 202.

In one embodiment of the present invention, one or more processors (e.g., from SDV on-board computer 301) determine that the current real-time driving mode of the vehicle has switched between the autonomous mode and the manual mode. In response to this occurrence, the processor(s) generate an updated driving mode indicator based on the current real-time driving mode switching between the autonomous mode and the manual mode, and the indicator emitter (e.g., speaker 119 shown in FIG. 1, or lights 319 or transceiver 323 shown in FIG. 3) broadcasts the updated driving mode indicator from the vehicle to the proximate entity. That is, whenever the driving mode of the vehicle switches from autonomous mode to manual mode, or from manual mode to autonomous mode, an updated driving mode indicator (e.g., a certain sound, light pattern, radio signal, etc.) is broadcast, informing all proximate entities (vehicular or pedestrian) to know that the vehicle has switched its mode of control.

In one embodiment of the present invention, one or more processor(s) match the driving mode indicator to the vehicle to create a matched driving mode indicator, and then transmit, from the vehicle, the matched driving mode indicator and display instructions to a display associated with the proximate entity. The display instructions direct the display to depict a location of the vehicle and the current real-time driving mode of the vehicle on the display. For example, consider now FIG. 5, which shows an exemplary GUI 501 that depicts the driving mode of nearby vehicles.

Figure 5:
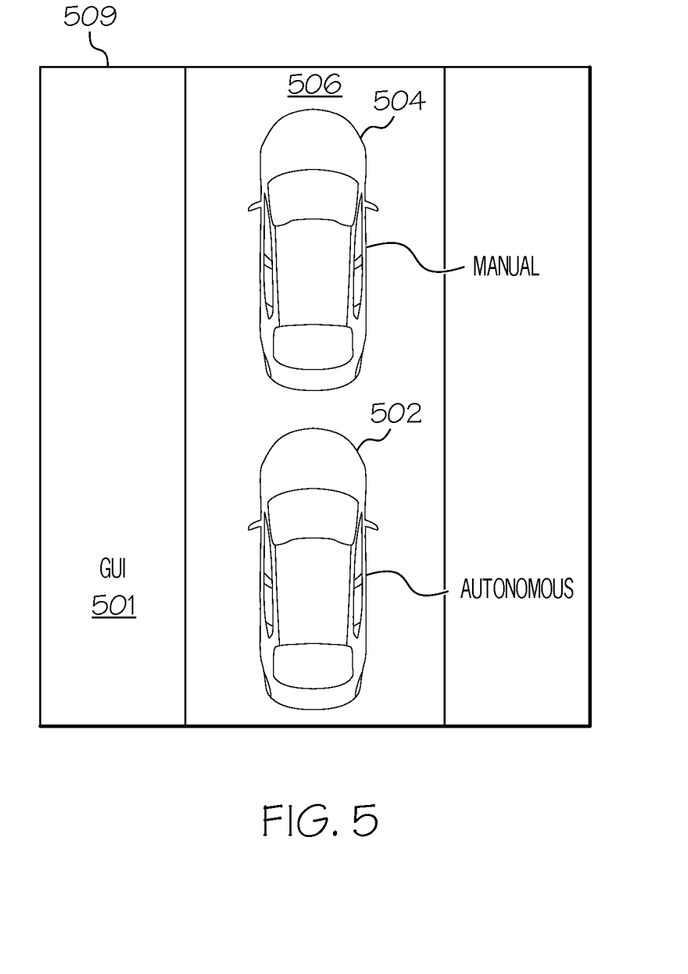
FIG. 5 depicts an exemplary graphical user interface (GUI) that displays the current real-time driving mode of one or more vehicles.

As shown in FIG. 5, GUI 501 is depicted on a display 509 (analogous to display 109 shown in FIG. 1) that is within a cabin of a vehicle 504 (analogous to vehicle 204 shown in FIG. 2), on a smart phone or other computing device carried by the occupant of the vehicle 504, etc. Also displayed on GUI 501 is a representation of vehicle 502 (analogous to vehicle 202 shown in FIG. 2) following closely behind vehicle 504 while traveling along the depicted roadway 506. The GUI 501 depicts vehicle 502 as operating in autonomous mode, and shows vehicle 504 is operating in manual mode. Thus, the occupants of vehicle 504 and/or the SDV on-board computer 301 (or similar logic) within vehicle 504 are reassured by the fact that the "tailgating" vehicle 502 is operating in autonomous mode (according to the driving mode indicator that is sent from the vehicle 502 to vehicle 504), and thus there is no need to take evasive actions (e.g., speeding up vehicle 504 in order to distance vehicle 504 from vehicle 502) or otherwise be concerned or take corrective actions.

In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
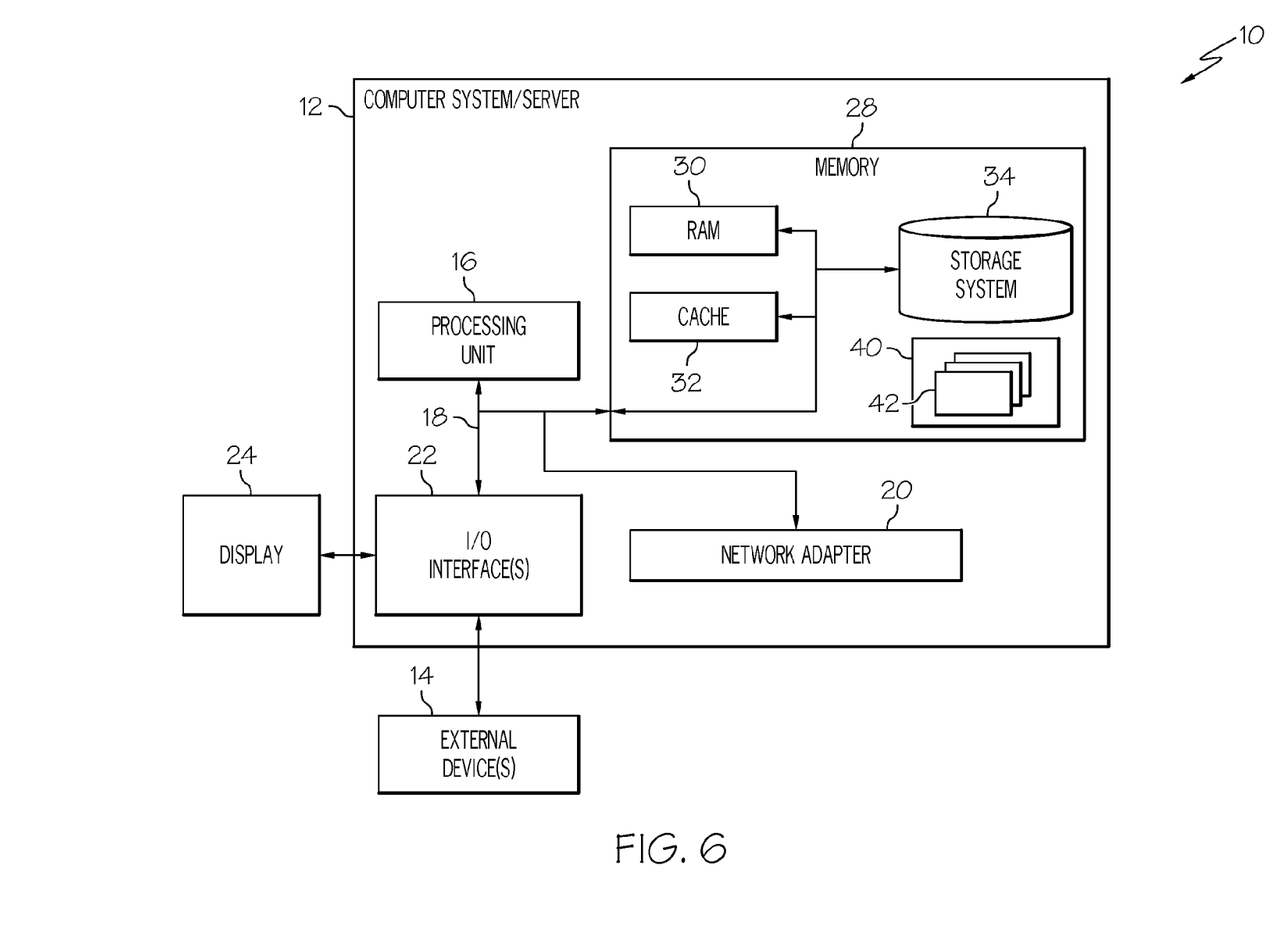
FIG. 6 depicts a cloud computing node according to an embodiment of the present disclosure.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
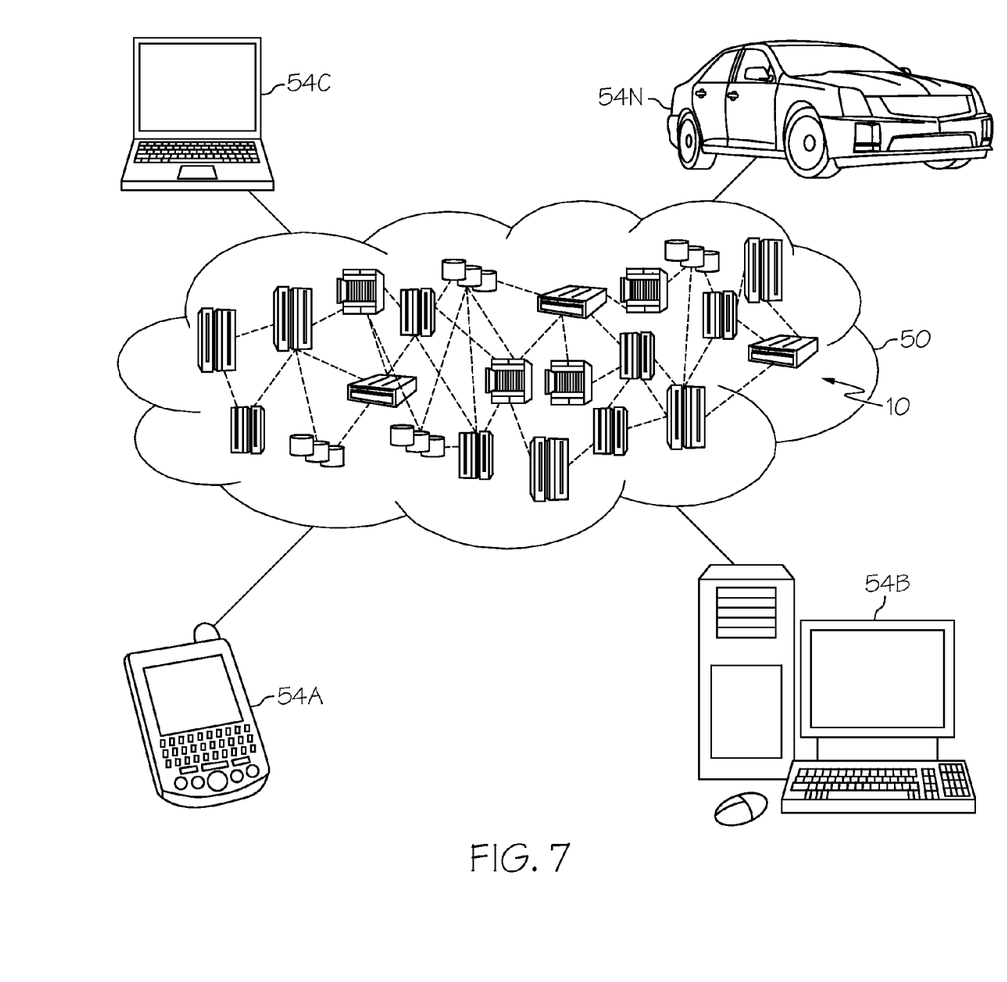
FIG. 7 depicts a cloud computing environment according to an embodiment of the present disclosure.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
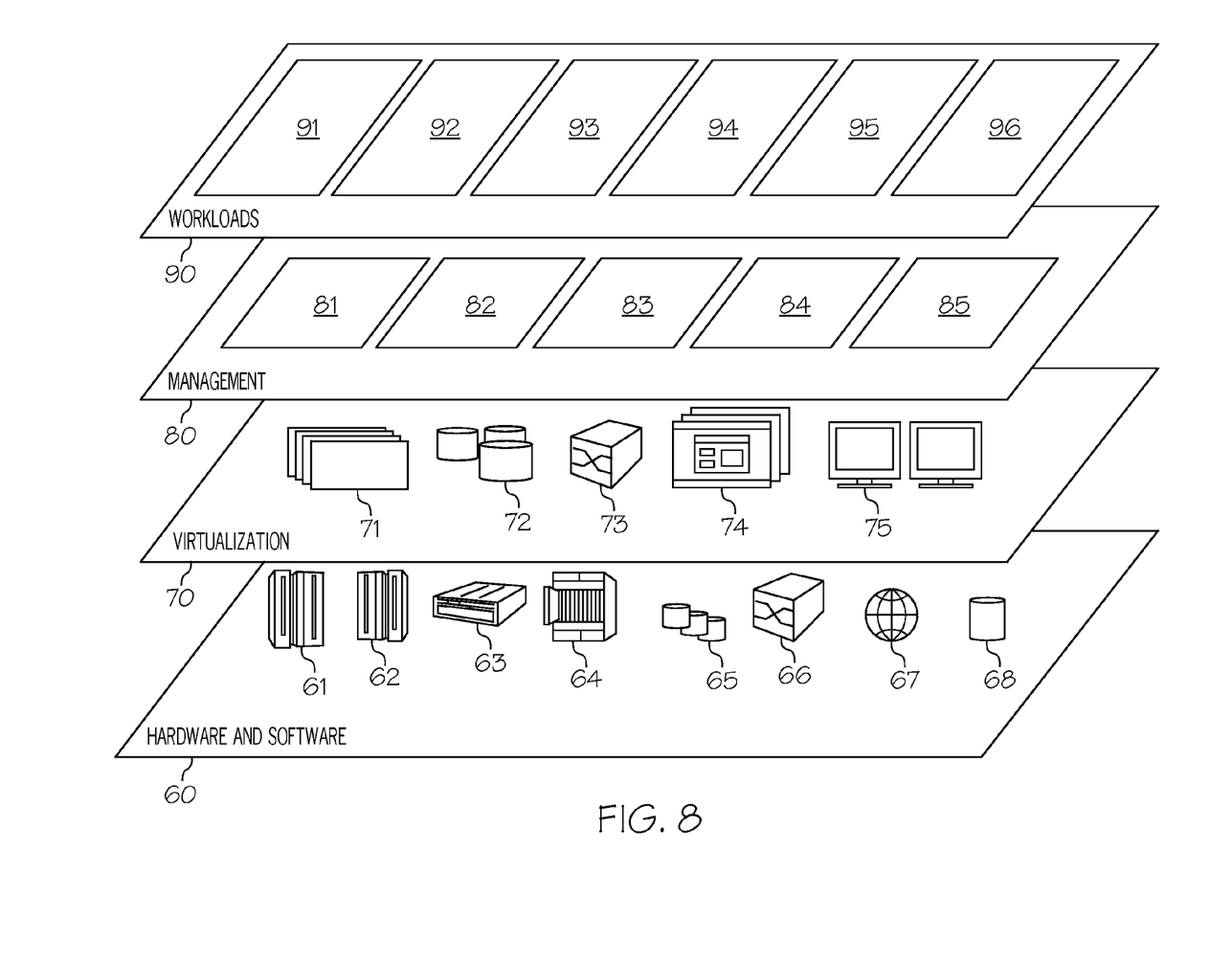
FIG. 8 depicts abstraction model layers according to an embodiment of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and self-driving vehicle control processing 96 (for alerting environmental entities of a current real-time driving mode of an SDV as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method for alerting a proximate entity of a current real-time driving mode of a vehicle, the computer-implemented method comprising:

determining, by one or more processors, a current real-time driving mode of a vehicle, wherein the current real-time driving mode is from a group consisting of an autonomous mode and a manual mode, wherein the vehicle is in the autonomous mode when being driven and controlled by an on-board computer, and wherein the vehicle is in the manual mode when being driven and controlled by a human driver;

generating, by one or more processors, a driving mode indicator that identifies the current real-time driving mode of the vehicle; and broadcasting, by an indicator emitter, the driving mode indicator from the vehicle to a proximate entity, wherein the driving mode indicator indicates the current real-time driving mode of the vehicle, wherein the proximate entity is an autonomous vehicle that is within a predefined distance from the vehicle, wherein the driving mode indicator is an electronic indicator that is transmitted to the on-board computer on the proximate entity, and wherein the electronic indicator causes the on-board computer to adjust a spacing between the proximate entity and the vehicle that broadcast the driving mode indicator according to whether the driving mode indicator indicates that the vehicle that broadcast the driving mode indicator is operating in the manual mode or the autonomous mode.

2. The computer-implemented method of claim 1, wherein the driving mode indicator is a visual indicator that is generated by the vehicle.

3. The computer-implemented method of claim 1, wherein the driving mode indicator is a sound that is generated by the vehicle.

4. The computer-implemented method of claim 1, further comprising:
 ceasing, by one or more processors, the broadcasting of the driving mode indicator from the vehicle to the proximate entity;
 subsequent to ceasing the broadcasting of the driving mode indicator from the vehicle to the proximate entity, receiving, by one or more processors, an interrogation message from the proximate entity, wherein the interrogation message requests the current real-time drive mode of the vehicle; and
 in response to receiving the interrogation message from the proximate entity, broadcasting, by one or more processors, the driving mode indicator from the vehicle to the proximate entity.

5. The computer-implemented method of claim 1, wherein the vehicle is a self-driving vehicle (SDV) that is capable of being driven in the autonomous mode, wherein the vehicle is currently being driven in the manual mode, and wherein the computer-implemented method further comprises:
 retrieving, by one or more processors, a profile of a driver of the vehicle;
 assigning, by one or more processors, the driver of the SDV to a cohort of persons, wherein the driver of the SDV shares more than a predetermined quantity of traits with members of the cohort of persons;
 receiving, by one or more processors, a driver safety rating for the cohort of persons; and
 in response to the driver safety rating for the cohort of persons falling below a predetermined value, automatically changing, by one or more processors, the driving mode of the vehicle from the manual mode to the autonomous mode.

6. The computer-implemented method of claim 1, further comprising:
 receiving, by one or more processors, interrogation messages from multiple proximate entities, wherein the interrogation messages request the current real-time drive mode of the vehicle;
 determining, by one or more processors, a quantity of interrogation messages that are received from the multiple proximate entities; and
 in response to determining that the quantity of interrogation messages exceeds a predetermined amount, broadcasting, by one or more processors, the driving mode indicator from the vehicle to the proximate entities.

7. The computer-implemented method of claim 1, further comprising:
 determining, by one or more processors, that the current real-time driving mode of the vehicle has switched between the autonomous mode and the manual mode;
 generating, by one or more processors, an updated driving mode indicator based on the current real-time driving mode switching between the autonomous mode and the manual mode; and
 broadcasting, by the indicator emitter, the updated driving mode indicator from the vehicle to the proximate entity.

8. The computer-implemented method of claim 1, further comprising:
 matching, by one or more processors, the driving mode indicator to the vehicle to create a matched driving mode indicator; and
 transmitting, from the vehicle, the matched driving mode indicator and display instructions to a display associated with the proximate entity, wherein the display instructions direct the display to depict a location of the vehicle and the current real-time driving mode of the vehicle on the display.

9. A computer program product for alerting a proximate entity of a current real-time driving mode of a vehicle, the computer program product comprising a non-transitory computer readable storage medium having program code embodied therewith, the program code readable and executable by a processor to perform a method comprising:
 determining a current real-time driving mode of a vehicle, wherein the current real-time driving mode is from a group consisting of an autonomous mode and a manual mode, wherein the vehicle is in the autonomous mode when being driven and controlled by an on-board computer, and wherein the vehicle is in the manual mode when being driven and controlled by a human driver;
 generating a driving mode indicator that identifies the current real-time driving mode of the vehicle; and
 broadcasting, by an indicator emitter, a driving mode indicator from the vehicle to a proximate entity, wherein the driving mode indicator indicates the current real-time driving mode of the vehicle, wherein the proximate entity is an autonomous vehicle that is within a predefined distance from the vehicle, wherein the driving mode indicator is an electronic indicator that is transmitted to the on-board computer on the proximate entity, and wherein the electronic indicator causes the on-board computer to adjust a spacing between the proximate entity and the vehicle that broadcast the driving mode indicator according to whether the driving mode indicator indicates that the vehicle that broadcast the driving mode indicator is operating in the manual mode or the autonomous mode.

10. The computer program product of claim 9, wherein the driving mode indicator is a visual indicator that is generated by the vehicle.

11. The computer program product of claim 9, wherein the driving mode indicator is a sound that is generated by the vehicle.

12. The computer program product of claim 9, wherein the proximate entity is an autonomous vehicle that is within a predefined distance from the vehicle, and wherein the driving mode indicator is an electronic indicator that is transmitted to the on-board computer on the autonomous vehicle.

13. The computer program product of claim 9, wherein the method further comprises:
 ceasing the broadcasting of the driving mode indicator from the vehicle to the proximate entity;
 subsequent to ceasing the broadcasting of the driving mode indicator from the vehicle to the proximate entity, receiving an interrogation message from the proximate entity, wherein the interrogation message requests the current real-time drive mode of the vehicle; and
 in response to receiving the interrogation message from the proximate entity, broadcasting the driving mode indicator from the vehicle to the proximate entity.

14. The computer program product of claim 9, wherein the vehicle is a self-driving vehicle (SDV) that is capable of being driven in the autonomous mode, wherein the vehicle is currently being driven in the manual mode, and wherein the method further comprises:
- retrieving a profile of a driver of the vehicle;
- assigning the driver of the SDV to a cohort of persons, wherein the driver of the SDV shares more than a predetermined quantity of traits with members of the cohort of persons;
- receiving a driver safety rating for the cohort of persons; and
- in response to the driver safety rating for the cohort of persons falling below a predetermined value, automatically changing the driving mode of the vehicle from the manual mode to the autonomous mode.

15. The computer program product of claim 9, wherein the method further comprises:
- receiving interrogation messages from multiple proximate entities, wherein the interrogation messages request the current real-time drive mode of the vehicle;
- determining a quantity of interrogation messages that are received from the multiple proximate entities; and
- in response to determining that the quantity of interrogation messages exceeds a predetermined amount, broadcasting the driving mode indicator from the vehicle to the proximate entities.

16. The computer program product of claim 9, wherein the method further comprises:
- determining that the current real-time driving mode of the vehicle has switched between the autonomous mode and the manual mode;
- generating an updated driving mode indicator based on the current real-time driving mode switching between the autonomous mode and the manual mode; and
- broadcasting, by the indicator emitter, the updated driving mode indicator from the vehicle to the proximate entity.

17. A computer system comprising:
- a processor, a computer readable memory, and a non-transitory computer readable storage medium;
- first program instructions to determine a current real-time driving mode of a vehicle, wherein the current real-time driving mode is from a group consisting of an autonomous mode and a manual mode, wherein the vehicle is in the autonomous mode when being driven and controlled by an on-board computer, and wherein the vehicle is in the manual mode when being driven and controlled by a human driver;
- second program instructions to generate a driving mode indicator that identifies the current real-time driving mode of the vehicle; and
- third program instructions to broadcast, via an indicator emitter, a driving mode indicator from the vehicle to a proximate entity, wherein the driving mode indicator indicates the current real-time driving mode of the vehicle, wherein the proximate entity is an autonomous vehicle that is within a predefined distance from the vehicle, wherein the driving mode indicator is an electronic indicator that is transmitted to the on-board computer on the proximate entity, and wherein the electronic indicator causes the on-board computer to adjust a spacing between the proximate entity and the vehicle that broadcast the driving mode indicator according to whether the driving mode indicator indicates that the vehicle that broadcast the driving mode indicator is operating in the manual mode or the autonomous mode; and wherein the first, second, and third program instructions are stored on the non-transitory computer readable storage medium for execution by one or more processors via the computer readable memory.

18. The computer system of claim 17, further comprising:
- fourth program instructions to receive interrogation messages from multiple proximate entities, wherein the interrogation messages request the current real-time drive mode of the vehicle;
- fifth program instructions to determine a quantity of interrogation messages that are received from the multiple proximate entities; and
- sixth program instructions to, in response to determining that the quantity of interrogation messages exceeds a predetermined amount, broadcast the driving mode indicator from the vehicle to the proximate entities; and wherein the fourth, fifth, and sixth program instructions are stored on the non-transitory computer readable storage medium for execution by one or more processors via the computer readable memory.

* * * * *